(12) United States Patent
Baset et al.

(10) Patent No.: US 8,930,955 B2
(45) Date of Patent: Jan. 6, 2015

(54) CONTROLLING GROWTH IN VIRTUAL DISKS VIA UTILIZATION OF PREVIOUSLY USED AND FREE DISK BLOCK SPACE

(75) Inventors: Salman A. Baset, New York, NY (US); Hai Huang, White Plains, NY (US); Chunqiang Tang, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 13/370,628

(22) Filed: Feb. 10, 2012

(65) Prior Publication Data

US 2013/0212593 A1 Aug. 15, 2013

(51) Int. Cl.
G06F 9/455 (2006.01)
G06F 13/00 (2006.01)
G06F 9/50 (2006.01)

(52) U.S. Cl.
CPC ..................... *G06F 9/50* (2013.01)
USPC ............... 718/104; 718/1; 718/102; 711/170; 711/165; 711/133

(58) Field of Classification Search
CPC ........ G06F 9/52; G06F 9/5016; G06F 9/5077
USPC .......... 711/170, 165, 6, 103; 718/1, 102, 104; 717/133; 709/217; 707/645; 358/1.15; 712/36
See application file for complete search history.

(56) References Cited

U.S. PATENT DOCUMENTS

| | | | | |
|---|---|---|---|---|
| 6,205,529 B1 * | 3/2001 | Shagam | | 711/170 |
| 7,945,911 B1 * | 5/2011 | Garthwaite | | 718/102 |
| 8,468,535 B1 * | 6/2013 | Keagy et al. | | 718/104 |
| 2006/0195824 A1 * | 8/2006 | Iwamoto | | 717/133 |
| 2008/0231885 A1 * | 9/2008 | Truong et al. | | 358/1.15 |
| 2009/0019249 A1 * | 1/2009 | Kessler | | 711/170 |
| 2010/0241785 A1 * | 9/2010 | Chen et al. | | 711/6 |
| 2011/0078404 A1 * | 3/2011 | Knirsch | | 711/170 |
| 2011/0153567 A1 * | 6/2011 | Sawdon et al. | | 707/645 |
| 2011/0289263 A1 * | 11/2011 | McWilliams et al. | | 711/103 |
| 2012/0110293 A1 * | 5/2012 | Yang et al. | | 711/170 |
| 2012/0151184 A1 * | 6/2012 | Wilkerson et al. | | 712/36 |
| 2012/0167080 A1 * | 6/2012 | Vilayannur et al. | | 718/1 |
| 2012/0239896 A1 * | 9/2012 | Sobel | | 711/165 |
| 2013/0042238 A1 * | 2/2013 | Cardona et al. | | 718/1 |
| 2013/0151659 A1 * | 6/2013 | Alberth et al. | | 709/217 |

OTHER PUBLICATIONS

Shrinking Virtual Disks, VMware Workstation 5.0 http://www.vmware.com/support/ws5/doc/ws_disk_shrink.html downloaded Aug. 27, 2012, pp. 1-2.
Fstrim, Free Development Software Downloads at SourceForge.net, http://sourceforge.net/projects/fstrim/ downloaded Aug. 27, 2012, pp. 1-2.
Parallels, Parallels Virtuozzo Containers for Windows Reference Guide, Version 4.0, 1999-2008, pp. 1-55.

* cited by examiner

*Primary Examiner* — Thomas Lee
*Assistant Examiner* — Aurel Prifti
(74) *Attorney, Agent, or Firm* — Ryan, Mason & Lewis, LLP

(57) ABSTRACT

A method, an apparatus and an article of manufacture for controlling growth in virtual disk size. The method includes limiting a guest virtual machine file in a hypervisor from allocating a new disk block as allocated space, wherein a virtual disk on a virtual machine is mapped to the guest virtual machine file, and facilitating the virtual disk to reuse a previously allocated and freed disk block for the allocated space to control growth in virtual disk size.

18 Claims, 4 Drawing Sheets

CONTROLLING GROWTH IN VIRTUAL DISKS VIA UTILIZATION OF PREVIOUSLY USED AND FREE DISK BLOCK SPACE

FIELD OF THE INVENTION

Embodiments of the invention generally relate to information technology, and, more particularly, to virtual disks.

BACKGROUND

Virtual machine (VM) images are often saved as files on a hypervisor, as there are several benefits in using files as opposed to dedicated physical block devices. Such benefits can include the following. Files can be thinly provisioned, and thus, allow storage space over-commit. Also, files can be managed (backed up, copied, deleted, etc.) more easily than dedicated block devices.

However, when using a thinly provisioned file as a virtual machine image, file system operations in the guest VM can cause the image file to quickly grow to its fully provisioned size, even when the guest VM's file system size is still far from being full. The fundamental problem is that a hypervisor cannot differentiate whether or not a data block is used by the guest VM or not (for example, if a block is allocated, and then deleted later).

Existing approaches include using a fully provisioned image file that has 1-to-1 mapping with guest file system, as well as using a dedicated physical partition or logic volume. However, the drawback of these approaches is that over-commit is not possible.

SUMMARY

In one aspect of the present invention, techniques for controlled growth in virtual disks are provided. An exemplary computer-implemented method for controlling growth in virtual disk size can include steps of limiting a guest virtual machine file in a hypervisor from allocating a new disk block as allocated space, wherein a virtual disk on a virtual machine is mapped to the guest virtual machine file, and facilitating the virtual disk to reuse a previously allocated and freed disk block for the allocated space to control growth in virtual disk size.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes techniques for controlled growth in virtual disks. An example embodiment of the invention includes controlling the growth of file-based images to better reflect the actual disk usage in a guest VM file system. An aspect of the invention includes limiting the guest file system from allocating new disk blocks and instead to reusing previously allocated and freed disk blocks as much as possible.

An example embodiment of the invention includes using a customized guest file system that is fully aware of the underlying storage as a thinly provisioned file, and therefore, when allocating new blocks, the system will prioritize those free blocks that were previously used. Another example embodiment of the invention includes using a virtual disk ballooning driver that runs inside of the virtual machine, wherein the ballooning driver grabs all unused disk space. In such an embodiment, the unused disk space will only be released when the guest file system is running out of space. Effectively, this will enforce the guest file system to reuse disk blocks.

Additionally, a virtual disk ballooning driver can be embodied as a kernel module. In such an embodiment, all of the free disk space in the file system is reserved to itself so it appears that the guest VM's file system is completely full. When a new block is requested and the file system has no free blocks left, the ballooning driver is checked. If the ballooning driver has free blocks, it un-reserves the requested number of blocks and provides them to the file system. The file system can satisfy the block allocation request using the blocks freed by the ballooning driver.

Figure 1:
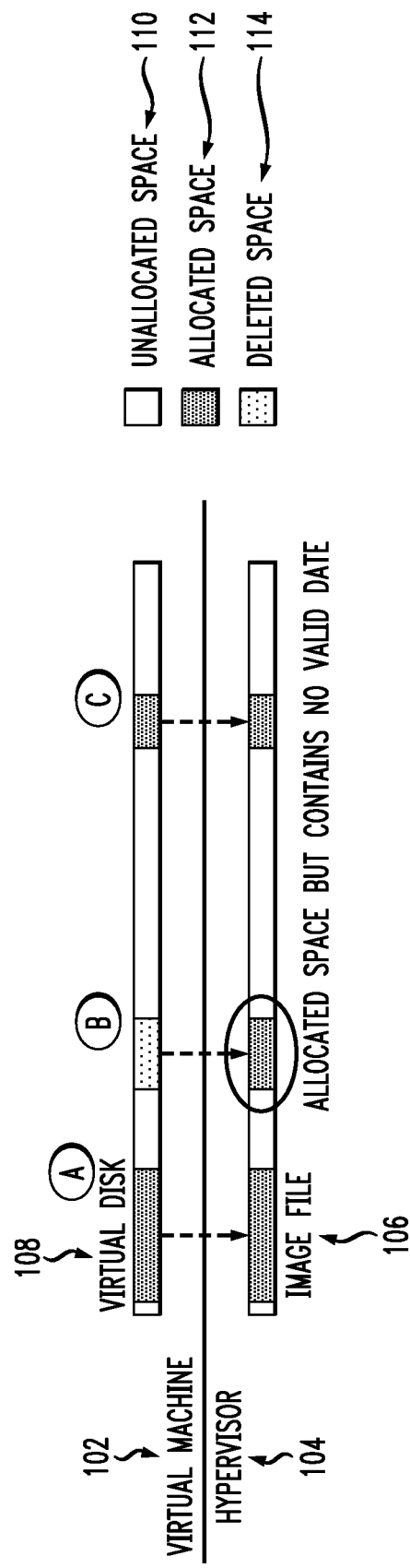
FIG. 1 is a diagram illustrating uncontrolled virtual disk growth.

FIG. 1 is a diagram illustrating uncontrolled virtual disk growth. By way of illustration, FIG. 1 depicts a virtual machine 102 and a hypervisor 104. The virtual machine 102 includes a virtual disk 108 with demarcations illustrated for spaces/operations A, B and C. The hypervisor 104 includes an image file 106 with demarcations illustrated the corresponding spaces (but not necessarily the operations) of A, B and C on the virtual disk. Further, both the virtual disk and the image file include unallocated space 110 and allocated space 112, while only the virtual disk in FIG. 1 includes deleted space 114.

As depicted in FIG. 1, when the file system in a virtual machine deletes a disk block (such as denoted by space/operation B), there is no corresponding "delete" operation in the image file, causing the image size to never shrink. Over time, image size can become much larger than the used file system size in the guest VM. A problem is that the guest file system does not favor re-using "deleted space."

Figure 2:
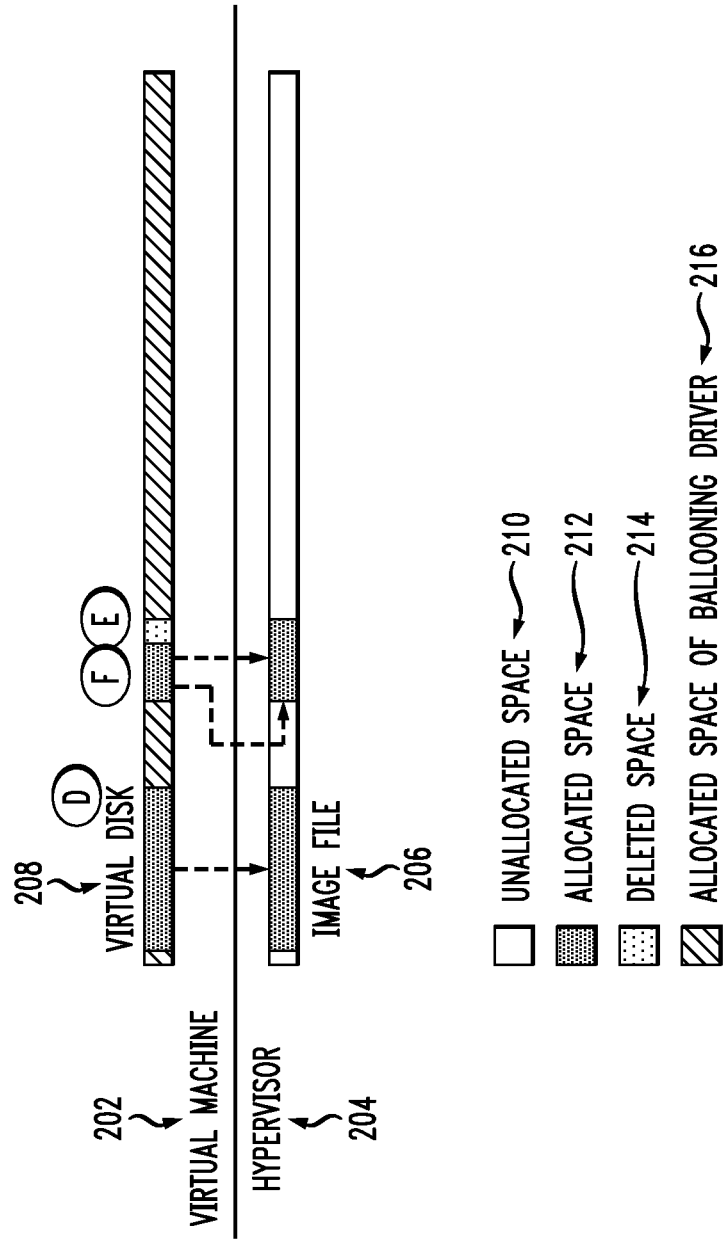
FIG. 2 is a diagram illustrating a virtual disk ballooning driver, according to an embodiment of the present invention.

FIG. 2 is a diagram illustrating a virtual disk ballooning driver, according to an embodiment of the present invention.

By way of illustration, FIG. 2 depicts a virtual machine 202 and a hypervisor 204. The virtual machine 202 includes a virtual disk 208 with demarcations illustrated for spaces/operations D, E and F. The hypervisor 204 includes an image file 206 with demarcations illustrated the corresponding spaces (but not necessarily the operations) of D, E and F on the virtual disk. Further, both the virtual disk and the image file include unallocated space 210 and allocated space 212, while only the virtual disk in FIG. 2 includes deleted space 214 and allocated space of the ballooning driver 216.

As depicted in FIG. 2, a ballooning driver forces a guest file system to prioritize reusing deleted space. In the example illustrated in FIG. 2, the image file is reusing previously used space (that is, space that would have been deleted in conjunction with the corresponding operation E of the virtual disk).

Figure 3:
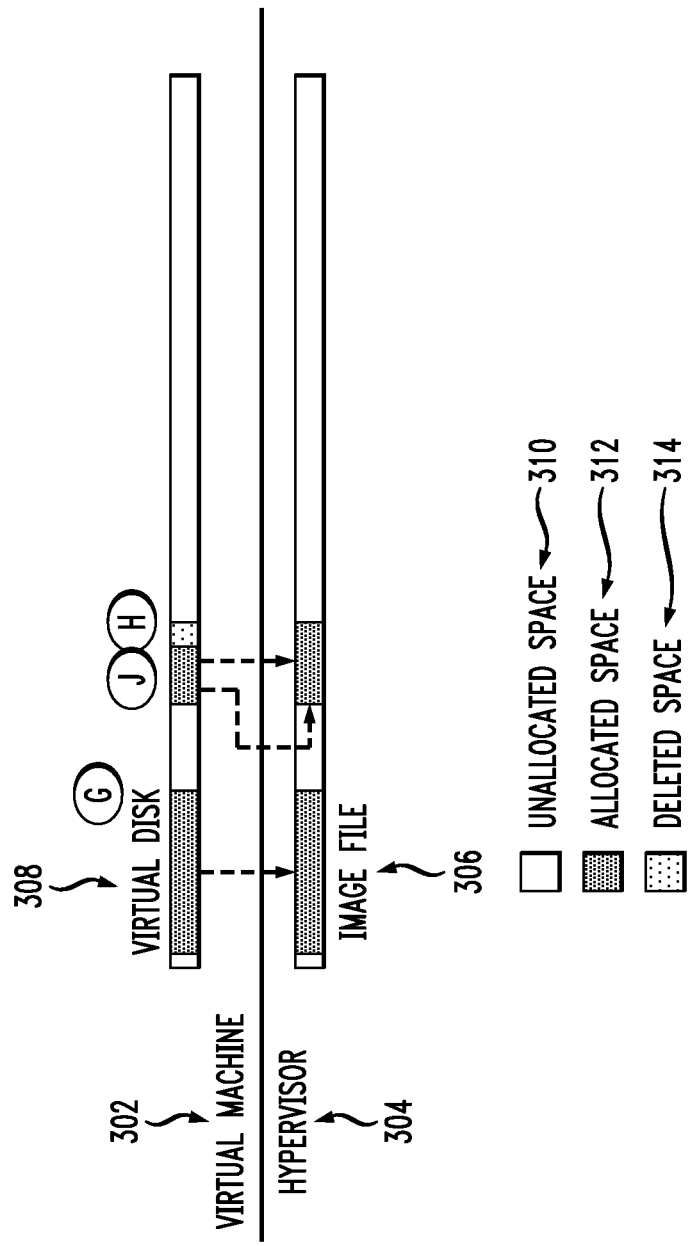
FIG. 3 is a diagram illustrating an image-file-aware guest file system, according to an embodiment of the present invention.

FIG. 3 is a diagram illustrating an image-file-aware guest file system, according to an embodiment of the present invention. By way of illustration, FIG. 3 depicts a virtual machine 302 and a hypervisor 304. The virtual machine 302 includes a virtual disk 308 with demarcations illustrated for spaces/operations G, H and J. The hypervisor 304 includes an image file 306 with demarcations illustrated the corresponding spaces (but not necessarily the operations) of G, H and J on the virtual disk. Further, both the virtual disk and the image file include unallocated space 310 and allocated space 312, while only the virtual disk in FIG. 3 includes deleted space 314.

As depicted in FIG. 3, a guest file system can explicitly reuse free blocks that were previously allocated before allocating new blocks to avoid getting out of sync with the size of the image file. Accordingly, in such an embodiment of the invention, the guest file system will keep additional meta data (free, used, free-but-previously-used). An example embodiment of the invention such as the one depicted in FIG. 3 may require modification to the guest file system (virtual machine).

Figure 4:
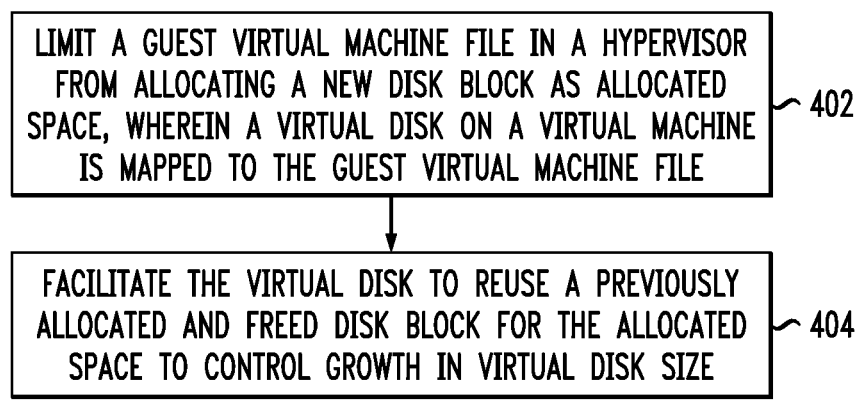
FIG. 4 is a flow diagram illustrating techniques for controlling growth in virtual disk size, according to an embodiment of the invention.

FIG. 4 is a flow diagram illustrating techniques for controlling growth in virtual disk size, according to an embodiment of the present invention. As described herein, controlling growth in virtual disk size better reflects actual disk usage in the guest virtual machine file. Step 402 includes limiting a guest virtual machine file in a hypervisor from allocating a new disk block as allocated space, wherein a virtual disk on a virtual machine is mapped to the guest virtual machine file.

Step 404 includes facilitating the virtual disk to reuse a previously allocated and freed disk block for the allocated space to control growth in virtual disk size. Facilitating the virtual disk to reuse a previously allocated and freed disk block for the allocated space can include modifying the guest virtual machine file to sequentially allocate disk blocks and reuse deleted disk blocks. Modifying the guest virtual machine file to sequentially allocate disk blocks and reuse deleted disk blocks can include prioritizing free blocks that were previously used for allocation.

Additionally, facilitating the virtual disk to reuse a previously allocated and freed disk block for the allocated space can include implementing a virtual disk ballooning driver that causes the guest virtual machine file to reuse a deleted disk block. In at least one embodiment of the invention, the virtual disk ballooning driver runs inside of the virtual machine and reserves all unused disk space on the virtual disk. The reserved unused disk space is released when the guest virtual machine file approaches a status of running out of space.

Further, at least one embodiment of the invention includes checking the virtual disk ballooning driver when a new block is requested and the virtual disk has no free blocks remaining, and un-reserving the requested new block and providing the new block to the virtual disk if the virtual disk ballooning driver has free blocks. As detailed herein, the virtual disk ballooning driver can be, for example, embodied as a kernel module.

The techniques depicted in FIG. 4 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules such as those detailed herein, can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 5:
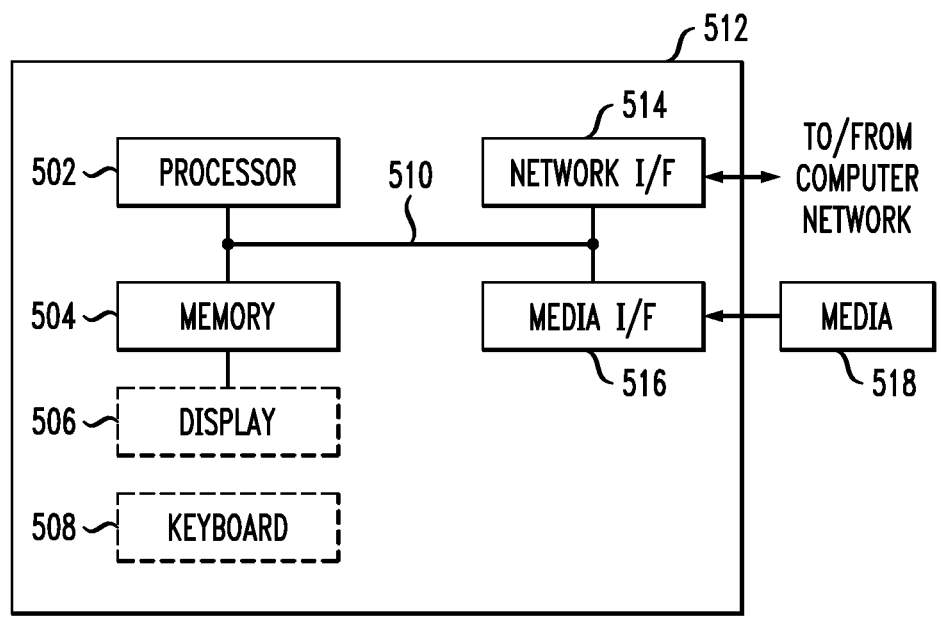
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, controlling the growth of file-based images to better reflect the actual disk usage in a guest VM file system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for controlling growth in virtual disk size, wherein the method comprises:
   impeding allocation of a guest virtual machine file to a new disk block in a hypervisor, wherein a virtual disk on a virtual machine is mapped to the guest virtual machine file; and
   facilitating allocation of the guest virtual machine file to a previously allocated disk block in the hypervisor to control growth in virtual disk size, wherein the previously allocated disk block in the hypervisor is mapped to previously allocated and deleted space in the virtual disk;
   releasing reserved unused disk space when the guest virtual machine file approaches a status of running out of space;
   checking a virtual disk ballooning driver when a new block is requested and the virtual disk has no free blocks remaining; and
   un-reserving the requested new block and providing the new block to the virtual disk if the virtual disk ballooning driver has free blocks;
   wherein at least one of the steps is carried out by a computer device.

2. The method of claim 1, wherein facilitating the virtual disk to reuse a previously allocated and freed disk block for the allocated space comprises modifying the guest virtual machine file to sequentially allocate disk blocks and reuse deleted disk blocks.

3. The method of claim 2, wherein modifying the guest virtual machine file to sequentially allocate disk blocks and reuse deleted disk blocks comprises prioritizing free blocks that were previously used for allocation.

4. The method of claim 1, wherein facilitating the virtual disk to reuse a previously allocated and freed disk block for the allocated space comprises implementing a virtual disk ballooning driver that causes the guest virtual machine file to reuse a deleted disk block.

5. The method of claim 4, wherein the virtual disk ballooning driver runs inside of the virtual machine.

6. The method of claim 4, wherein the virtual disk ballooning driver reserves all unused disk space on the virtual disk.

7. The method of claim 4, wherein the virtual disk ballooning driver is embodied as a kernel module.

8. The method of claim 1, wherein controlling growth in virtual disk size better reflects actual disk usage in the guest virtual machine file.

9. An article of manufacture comprising a computer readable storage memory having computer readable instructions tangibly embodied thereon which, when implemented, cause a computer to carry out a plurality of method steps comprising:
- impeding allocation of a guest virtual machine file to a new disk block in a hypervisor, wherein a virtual disk on a virtual machine is mapped to the guest virtual machine file; and
- facilitating allocation of the guest virtual machine file to a previously allocated disk block in the hypervisor to control growth in virtual disk size, wherein the previously allocated disk block in the hypervisor is mapped to previously allocated and deleted space in the virtual disk;
- releasing reserved unused disk space when the guest virtual machine file approaches a status of running out of space;
- checking a virtual disk ballooning driver when a new block is requested and the virtual disk has no free blocks remaining; and
- un-reserving the requested new block and providing the new block to the virtual disk if the virtual disk ballooning driver has free blocks.

10. The article of manufacture of claim 9, wherein facilitating the virtual disk to reuse a previously allocated and freed disk block for the allocated space comprises modifying the guest virtual machine file to sequentially allocate disk blocks and reuse deleted disk blocks.

11. The article of manufacture of claim 10, wherein modifying the guest virtual machine file to sequentially allocate disk blocks and reuse deleted disk blocks comprises prioritizing free blocks that were previously used for allocation.

12. The article of manufacture of claim 9, wherein facilitating the virtual disk to reuse a previously allocated and freed disk block for the allocated space comprises implementing a virtual disk ballooning driver that causes the guest virtual machine file to reuse a deleted disk block.

13. The article of manufacture of claim 12, wherein the virtual disk ballooning driver reserves all unused disk space on the virtual disk.

14. A system for controlling growth in virtual disk size, comprising:
- at least one distinct software module, each distinct software module being embodied on a tangible computer-readable memory;
- a memory; and
- at least one processor coupled to the memory and operative for:
  - impeding allocation of a guest virtual machine file to a new disk block in a hypervisor, wherein a virtual disk on a virtual machine is mapped to the guest virtual machine file; and
  - facilitating allocation of the guest virtual machine file to a previously allocated disk block in the hypervisor to control growth in virtual disk size, wherein the previously allocated disk block in the hypervisor is mapped to previously allocated and deleted space in the virtual disk;
  - releasing reserved unused disk space when the guest virtual machine file approaches a status of running out of space;
  - checking a virtual disk ballooning driver when a new block is requested and the virtual disk has no free blocks remaining; and
  - un-reserving the requested new block and providing the new block to the virtual disk if the virtual disk ballooning driver has free blocks.

15. The system of claim 14, wherein the at least one processor coupled to the memory operative for facilitating the virtual disk to reuse a previously allocated and freed disk block for the allocated space is further operative for modifying the guest virtual machine file to sequentially allocate disk blocks and reuse deleted disk blocks.

16. The system of claim 15, wherein the at least one processor coupled to the memory operative for modifying the guest virtual machine file to sequentially allocate disk blocks and reuse deleted disk blocks is further operative for prioritizing free blocks that were previously used for allocation.

17. The system of claim 14, wherein the at least one processor coupled to the memory operative for facilitating the virtual disk to reuse a previously allocated and freed disk block for the allocated space is further operative for implementing a virtual disk ballooning driver that causes the guest virtual machine file to reuse a deleted disk block.

18. The system of claim 17, wherein the virtual disk ballooning driver reserves all unused disk space on the virtual disk.

* * * * *